Figure 1:
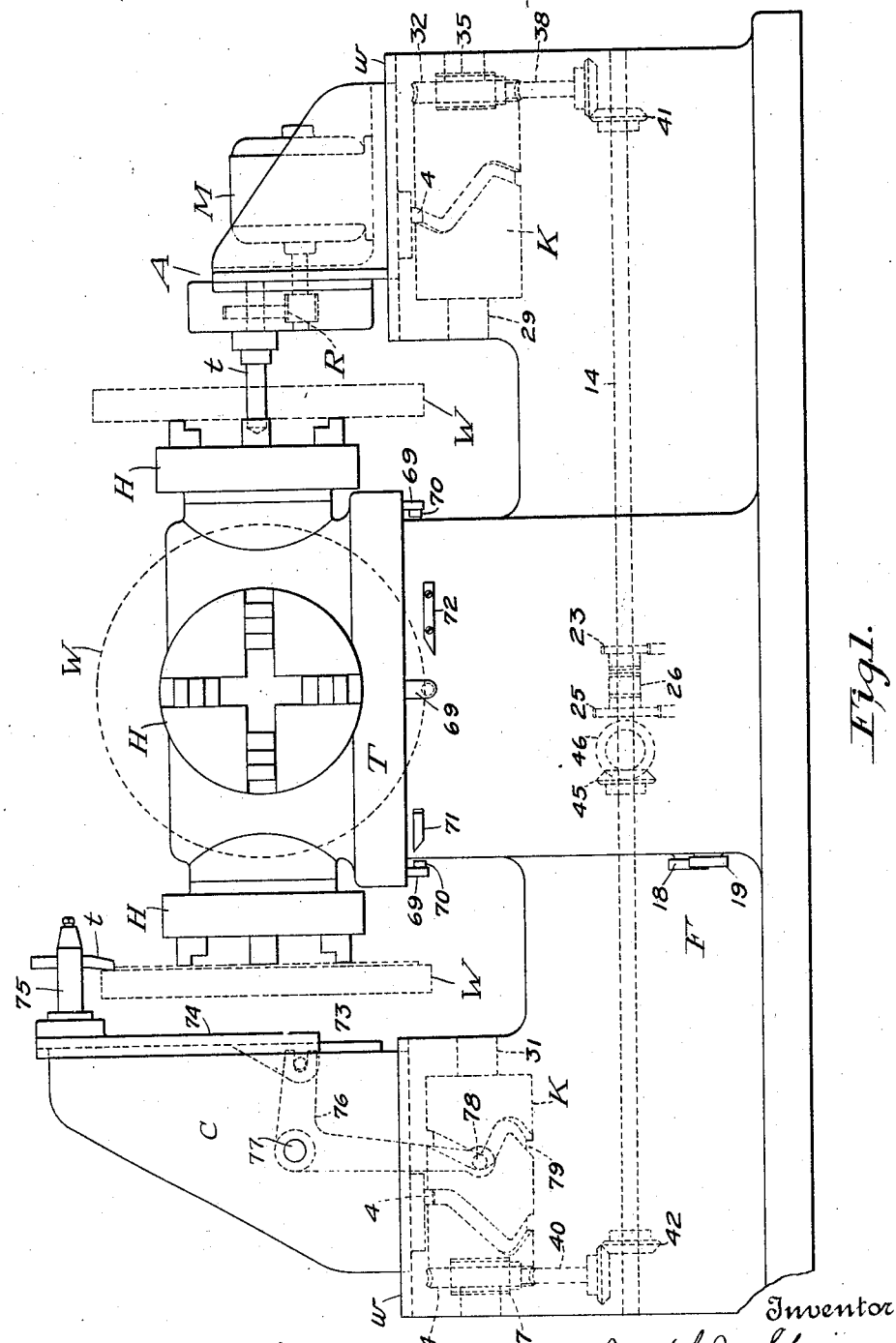

May 12, 1931.  J. J. SPRING  1,805,054
WORK ROTATING TYPE OF CHUCKING MACHINE
Filed March 31, 1928   5 Sheets-Sheet 1

Inventor
Joseph J. Spring
By His Attorneys
Nathan & Bowman

May 12, 1931. J. J. SPRING 1,805,054
WORK ROTATING TYPE OF CHUCKING MACHINE
Filed March 31, 1928 5 Sheets-Sheet 3
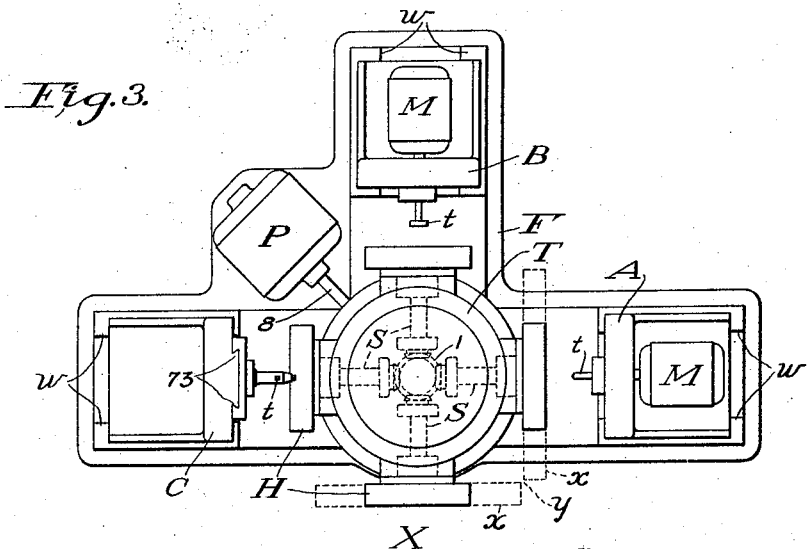
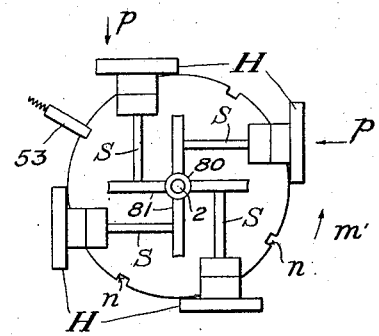
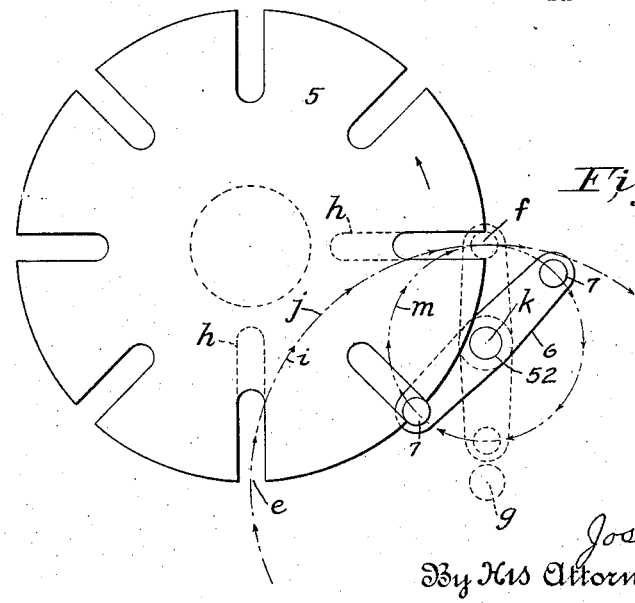
Inventor
Joseph J. Spring
By His Attorneys
Nathan & Bowman

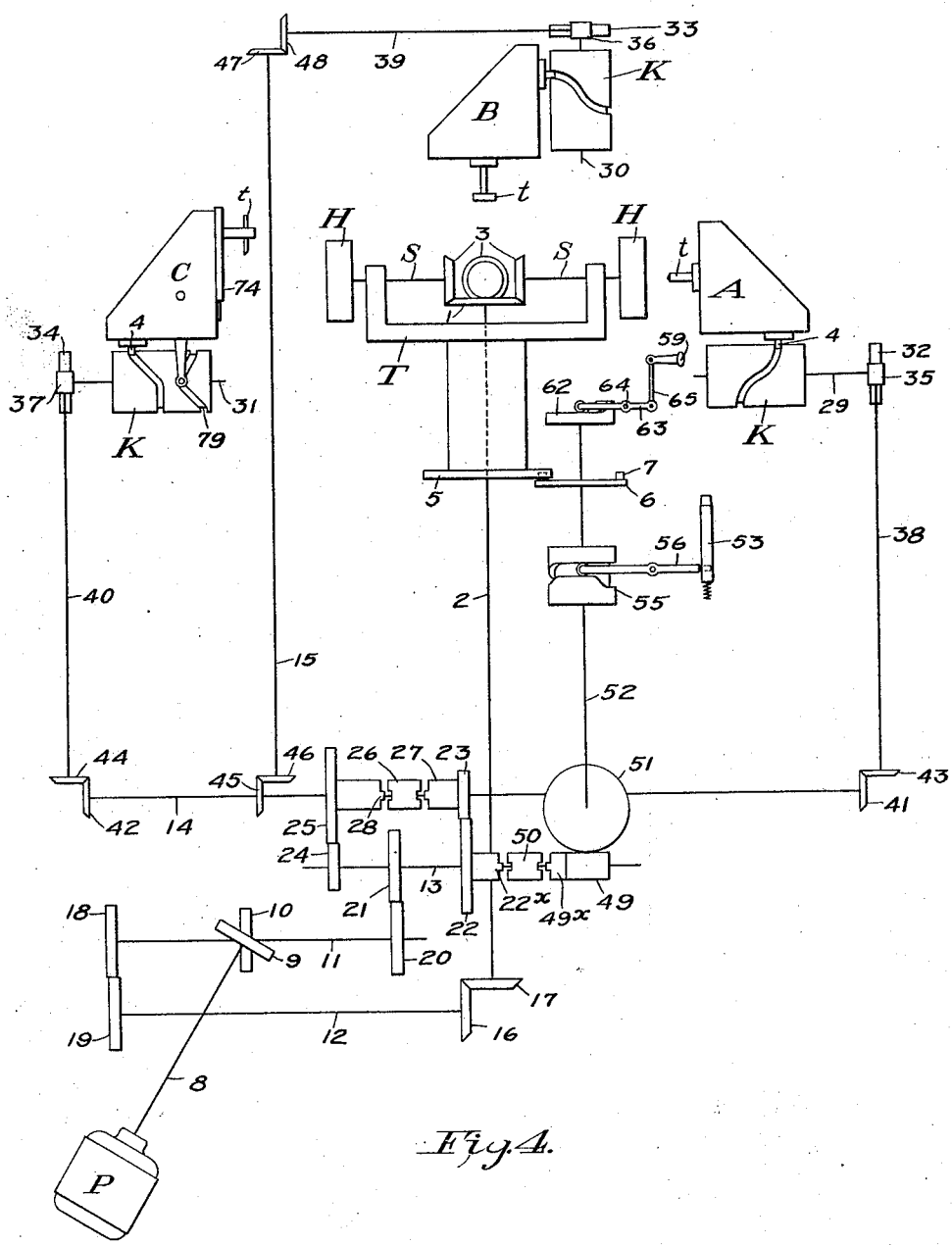

Inventor
Joseph J. Spring
By His Attorneys
Nathan & Bowman

Patented May 12, 1931

1,805,054

UNITED STATES PATENT OFFICE

JOSEPH JOHN SPRING, OF NEW BRITAIN, CONNECTICUT, ASSIGNOR TO THE GOSS AND DELEEUW MACHINE COMPANY, OF NEW BRITAIN, CONNECTICUT, A CORPORATION OF CONNECTICUT

WORK ROTATING TYPE OF CHUCKING MACHINE

Application filed March 31, 1928. Serial No. 266,386.

This invention relates to chucking machines of that type in which work-pieces are carried by rotating spindles and are presented successively to the action of a plurality of suitable tools. So far as applicant is aware, all chucking machines of this work-rotating type heretofore provided have been constructed with a plurality of rotating work-carrying spindles revolvable about a central axis with their axes parallel to each other and to the axis about which they revolve. A number of machine tool manufacturers heretofore have provided chucking machines having the rotating work spindles arranged as above described. Among these may be noted the Bullard, Cleveland, Gridley and New Britain companies.

Chucking machines of the type described are practical and satisfactory for operating upon relatively small parts, but they are impractical for large work inasmuch as the size of the work-chucks is limited to the distance between centers of the parallel work spindles. To obtain the necessary spacing between parallel work-spindles to enable them to carry work-chucks sufficiently large to receive relatively large work pieces (for example work-pieces eighteen inches in diameter) would necessitate the provision of a monstrous work-turret. Every other part of the machine would, of course, have to be built in proportion to the size of the work-turret thereby producing a machine so gigantic in size as to be impractical. Therefore, although the high efficiency of the work rotating type of chucking machine is well known and the low cost of production of parts in this type of machine tool is recognized and appreciated, nevertheless this type of machine tool heretofore necessarily has been limited to relatively small work-pieces.

This invention has for an object to provide a chucking machine of the work-rotating type which is practically unlimited insofar as the size of work-piece is concerned. To this end the invention contemplates a chucking machine having a plurality of work-rotating spindles arranged substantially radial in a suitable indexing head instead of with their axes parallel, as in prior chucking machines. It will readily be perceived that with the spindles arranged radially and having the work-chucks secured to their outer ends the chucks may be sufficiently large to hold relatively large work-pieces without interference between the chucks, such as would result were the spindles arranged parallel to each other.

Another object of this invention is to render available a chucking machine which more conveniently may be loaded and unloaded by the operator with a greater degree of safety and with materially less effort and fatigue than many prior machines. In conventional chucking machines having parallel spindles, the operator is located beside the chuck about to discharge a finished work piece and to receive a new one. In loading and unloading that type of chucking machine the operator usually is required to reach over certain parts of the machine, off to one side and in between the chucks and the tool head. He therefore necessarily must assume an awkward position and must handle the work almost entirely with one hand. Although this may be done with relatively small work-pieces it would be extremely difficult, if not impossible, were relatively large and heavy work pieces to be machined. With the spindles arranged radially, as in a machine built in accordance with this invention, the operator faces the chuck without any intervening elements. He therefore can use both hands to lift the work-pieces and can place them in the open chuck without assuming any inconvenient or awkward position.

In prior chucking machine of this type all internally operating tools, such for example as drilling, boring and reaming tools have been non-translatably mounted in a single sliding head and a single means; (usually a cam) has been provided to translate the tool head, thereby to give the tools their feeding movements. All of the tools therefore, have had the same rate of feed. Due to the nature of the various operations, for best results certain ones of the tools should be fed faster than certain others of the tools. Therefore any machine having a single feeding rate for a plurality of tools adapted to perform unlike operations (which rate is merely an approximation) can not function most efficiently or produce the most satisfactory results.

This invention contemplates supporting the tools in individual tool-slides and providing individual feeding means for each tool-slide whereby each tool may be given its feeding movements at the most efficient and desirable rate.

Also in prior machines the rate of relative rotation between the work and all of the tools has been uniform. An object of this invention is to provide individual rates of relative rotation between the work and the tool whereby each tool may operate under conditions most favorable to it, to the end that better work may be produced and the entire machine tool may be operated more efficiently than heretofore has been possible. This object has been attained by providing means for rotating all of the work-spindles in a single direction at a uniform rate and providing auxiliary means for giving to the individual tools either positive or negative rotation relative to the direction of rotation of the work whereby any desired relative rotation between the work and the tool may be attained.

A further object of this invention is to provide an improved indexing mechanism for the rotatable work turret which shall be free from certain undesirable features inherent in prior indexing mechanisms. One of the most satisfactory types of indexing mechanisms heretofore provided is the so-called "Geneva index". This mechanism, however, has the objection that during the indexing movement the driven element is gradually accelerated as the driving stud is traversing the radial slot therein from the periphery of the driven element to a point nearest the center thereof. Therefore by the time the indexing movement is half completed the driven element is being spun at a relatively rapid rate. During the last half of the indexing movement i. e. as the stud is withdrawing from the radial slot the driving element must serve as a brake to overcome the momentum of this rapidly rotated driven element. It has been found that where the driven element, and the load carried thereby, are relatively heavy this acceleration and retardation consume an excessive amount of power and cause undue wear and strain on the parts.

The present invention obviates these undesirable features by providing an improved index of the Geneva type which must be actuated twice to effect a predetermined angular movement of the driven element and then actuating the driving element instead of but once as heretofore. This is effected by doubling the number of the radial slots in the driven element, materially reducing the length of the lever arm of the driving element twice for each required indexing movement. By means of this construction the driving element is always in engagement with the driven element relatively near its periphery and therefore the undesired acceleration of the driven element is greatly reduced. This gives a more regular rotary indexing movement to the work table which may be produced with materially less power and wear than in prior construction.

Difficulty heretofore has been experienced in the operation of chucking machines in which the work spindles are arranged parallel, with their axes horizontal due to the fact that chips falling from an upper spindle land on a lower spindle or the work carried thereby. These chips sometimes find their way into the spindle bearings causing wear therein and they also sometimes interfere with the operation of the lower tools. This invention obviates this undesirable condition by the radial arrangement of the spindles in which no chuck overlies any other chuck or spindle, and therefore the chips falling from one tool can not cause damage to the machine or interference between any other tool and its work-piece.

Still another object is to provide an improved balanced drive for the work spindles. This object has been attained by the provision of a worm gear fitted to each of said work spindles and all meshing with a master worm; said worm wheels being arranged about the periphery of the worm. With this arrangement the spindles are not truly radial, being slightly off-set from radial lines but nevertheless chuck interference is avoided. This offset arrangement of the spindles affords another advantage, to wit, it enables the pressure of the tool on the work to exert a strain on the work turret always tending to turn it in one direction. This causes the turret always to bear against the same side of a suitable turret locking bolt, thereby taking up all back-lash and holding the turret against vibration during the machining operation even though the locking bolt, its guides, or the walls of the bolt-receiving aperture in the turret may be somewhat worn.

Still another object of this invention is to provide improved means for advancing suitable turning tools to the work and for retracting them after the turning operation has been completed, to permit indexing of the work-turret and the work. It will readily be perceived that where relatively large work pieces are being operated on, the holder of any tool operating thereon, if moved parallel to the axis of the work, must be given a substantial movement to carry it out of the path of the outermost portions of the work as it is indexed. This invention proposes mounting the turning tools above the rotating work piece and moving it vertically into and out of contact therewith. By this arrangement a relatively slight movement of the tool, transverse to the axis of rotation of the work serves to bring the tool into contact with the work and to move it and its carrier out of the path of movement of the work as it is indexed.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
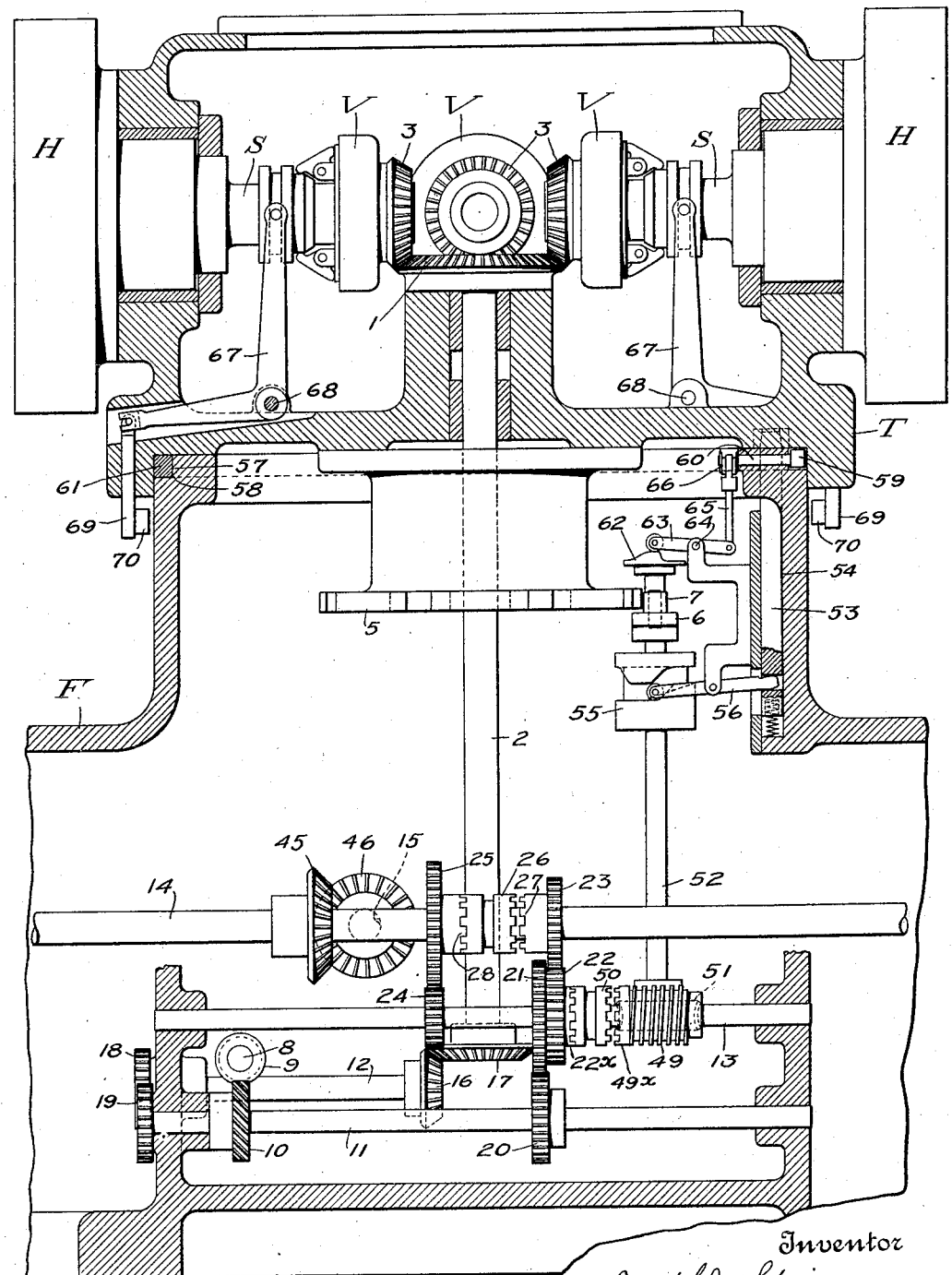
Figure 7:
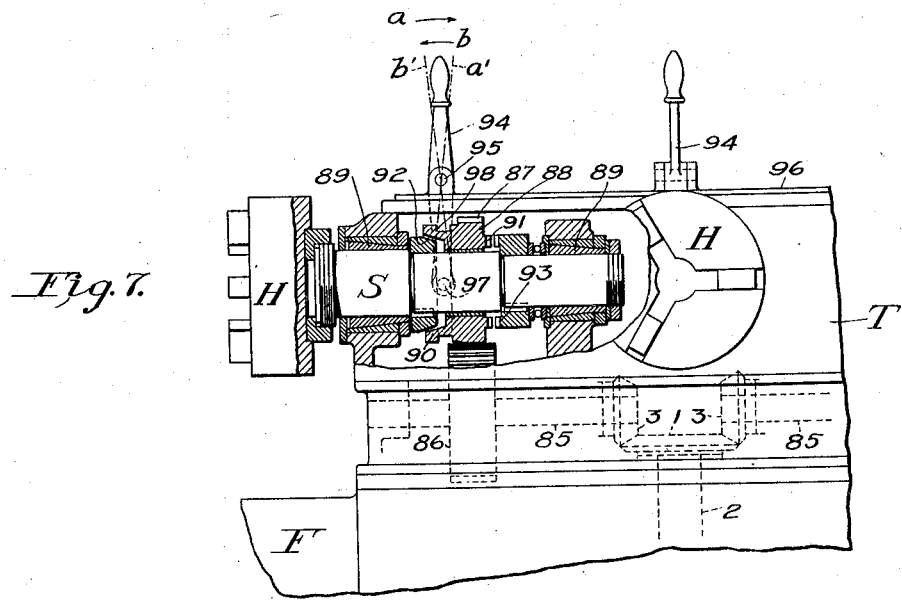
Figure 8:
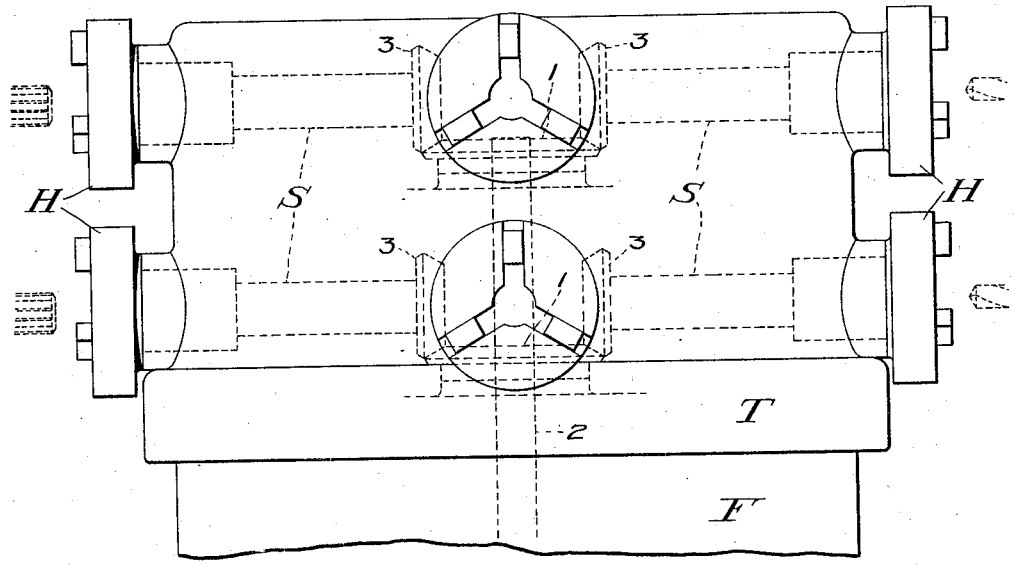

Figure 1 is a side view of a chucking machine embodying the present invention. Fig. 2 is an enlarged vertical section through the central portion of Fig. 1, showing the work-turret, the indexing means therefor, the spindle rotating means and other mechanism later to be referred to. Fig. 3 is a plan of Fig. 1 on a reduced scale. Fig. 4 is a diagrammatic view illustrating the drives for effecting rotation of the work-spindles, advance and retraction of the tools, indexing of the work-turret and the turret-locking and clamping means, all later to be described. Fig. 5 is a detail view of the improved Geneva index mechanism. Fig. 6 is a plan of the work-turret showing the work-spindles arranged in off-set relation to radial lines and driven by a common worm and individual worm-wheels. Fig. 7 is a side view, partly in section, of a portion of the work-turret, showing a modified drive for the work-spindles. Fig. 8 is a modification showing the work-turret provided with a plurality of sets of radially disposed work-spindles.

Referring more specifically to the drawings, the invention is illustrated as embodied in a chucking machine comprising a main frame, or base F supporting, at an intermediate point, a work-turret T. Translatably mounted on ways $w$ provided by the main frame, about the work-turret are a plurality of tool-heads each carrying a tool, or tools, for operating on work-pieces as later will be explained. In the drawings the machine is illustrated as embodying three tool-heads A, B and C, but it is to be understood that a greater number may be employed. Rotatably supported by the turret T are a plurality of radially disposed (or substantially so) work spindles S, the number of the spindles preferably being one more than the number of tool heads supported about the turret. The spindles are all rotated at a uniform rate from a common driver which, as shown in Figs. 2, 3 and 4, may comprise a bevel gear 1 fixed upon a rotatable shaft 2. When a bevel gear is employed as a driver each of the radially disposed spindles carries at its inner end a similar gear 3 meshing with the common driver. Upon the outer end of each of the spindles is secured a work-holder designated generally as H. These holders may be of any suitable or preferred form, such for example as the jaw chucks shown in Fig. 1.

As hereinbefore stated this invention relates primarily to chucking machines capable of handling relatively large work-pieces. To that end the work-holders mounted upon the outer ends of radial spindles overhang the periphery of the work-turret as shown for example in Fig. 1. It will readily be perceived that with the work-holders fixed upon the outer ends of radially disposed spindles and overhanging the turret, the size of the work-holder, and the work-piece carried thereby, is practically unlimited, it being possible to employ work-holders each at least as large in diameter as the work-turret (as illustrated in dotted lines at $x$ in Fig. 3) without causing interference at their most adjacent points $y$.

Each of the tool-heads carries one or more tools $t$ which are adapted successively to operate upon the work-pieces W carried by the rotating work-holders H. Certain ones of the tools preferably are internally operating tools and others (such for example as the tool carried by the head C) may be adapted primarily for turning operations on the exterior of the work-pieces. Inasmuch as the number of spindles is one more than the number of tool-heads this leaves one inoperative station for each tool holder in a complete cycle of the turret. This inoperative station designated X in Fig. 3, is utilized as a loading and unloading station where the operator may put the unfinished work-pieces in the work-chucks and remove the finished pieces therefrom. A new work-piece having been placed in the chuck at station X the turret is indexed counter-clockwise, as viewed in plan, successively to present the work-piece to the action of the tools carried by the tool-head A, B and C.

Inasmuch as dissimilar operations are performed by the various tools, it is obvious that the speed produced by the bevel gears 1 and 3 might not be most efficient for all of the operations. This invention overcomes this difficulty and increases the efficiency of the machine by providing individual speeders for the various rotating tools whereby each tool may be rotated relative to the rotating work-piece. Thus should the speed of rotation of the spindles be too slow for most satisfactory and efficient operation at any one of the operating stations, the tool at that station may be rotated in opposition to the direction of rotation of the work-piece, thereby effecting a relative rotation between the work-piece and the tool, the rate of which is the sum of the speeds of rotation of the two. Likewise should the rate of rotation of the spindles be too fast for any particular operation the tool adapted to perform that operation may be rotated in the same direction as the work-piece at any desired rate to produce the desired rate of relative rotation between the two. Any suitable means may be provided for individually rotating the tools. As shown in the drawings this may be effected by providing the tool-heads with individual motors M operatively connected to the tools by suitable speed-reduction gearing designated generally as R. The motors M may be of the reversible type, thereby permitting the tools to be rotated either with, or in opposition to, the direction of rotation of the work-spindles.

To give to the tools $t$ individual feeding movements toward and from the work-pieces, at any desired rate, a rotary cam K, preferably of the barrel type, is mounted in the main frame adjacent each tool head. A stud 4 carried by each of said tool-heads tracks the groove of one of said cams and therefore rotation of the cams effect translation of the tool-heads, the rate of said translation being determined by the inclination of the cam groove and the rate of rotation of the cam barrel. This invention contemplates accelerating the rotation of the cam to effect a more rapid retraction of the tool heads than could conveniently be effected at the normal slow rotation of the cam. The means for effecting this acceleration will be described later.

As heretofore stated, the turret is indexed after each operation of the tools on the work-piece. To effect this index there has been provided an improved Geneva mechanism illustrated in Figures 2 and 5. The machine shown in the drawings provides three machining stations and one loading and unloading station. Thus after each operation the turret must be indexed 90° to carry the work piece to the next station.

In conventional Geneva index mechanisms, to obtain an index of 90°, that is from $e$ to $f$ in Figure 5, the driver would be journaled at $g$ and a stud on the driver, entering the radial $h$ of the disk 5 at $e$, would be given an uninterrupted movement through the dotted path $i$ emerging from the slot $h$ at $f$. In the first 45° movement of the stud in the slot i. e. from the point $e$ to the intermediate point $j$ the stud would exert an accelerating movement on the disk and the turret connected therewith, with the result that when the driving stud was passing through the point $j$ the disk and turret together with the work-holders and work-pieces carried thereby would be turning at a relatively rapid rate. During the last 45° movement the stud would be required to serve as a brake to overcome the momentum of the disk, the turret and the parts carried thereby. Thus it will be perceived that where a substantially heavy load is to be moved a conventional Geneva index necessarily consumes a great amount of power during the first half of the indexing movement and is subjected to great strain and wear in the last half of the indexing movement.

This invention obviates these undesirable features of the Geneva type of index by so modifying the mechanism that the complete indexing movement is divided into two stages, thereby greatly reducing the acceleration and retardation of the parts with the result that the indexing movement may be effected more smoothly, with substantially less power, and the wear and strain on the parts is materially lessened. This has been effected by doubling the number of radial slots in the index disk 5, providing a driver 6 having two operating studs 7, locating the axis of the driver at the point $k$ and giving the driver 6 a complete rotation for each two stage indexing movement of the disk 5. With this arrangement the lever-arms of the driver are materially shorter than in prior devices and therefore the driving studs do not exert the objectionable accelerating action on the disk 5. With this improved construction the studs rotate in the path $m$ which does not approach the axis of the disk. The rotation of the disk therefore is more uniform than in prior constructions, the action of the driver on the disk being more in the nature of a gear drive. After each two-stage index of the disk 5 the movement of the driver 6 is arrested and the turret is locked against further movement.

Any suitable means may be provided for transmitting motion to the spindles S, feed cams K and the indexing mechanism. Figure 4 shows diagrammatically one drive which may be utilized. As shown in that figure power is provided by a suitable prime mover P which conveniently may be an electric motor supported upon the main frame as shown in Figure 3. A shaft 8, driven by the prime mover, carries a gear 9 meshing with a gear 10 fixed upon a shaft 11 journaled horizontally in the machine frame. Also journaled horizontally in the machine frame are shafts 12, 13, 14 and 15. The shaft 12 is adapted to transmit motion to the spindle-rotating shaft 2 and is connected thereto by bevel gears 16 and 17. A pair of intermeshing spur gears 18 and 19 connect the shafts 11 and 12. These gears are preferably removably secured to the ends of the shafts and are adapted to be removed and replaced by others of different ratio to vary the rate of rotation of the work-spindles.

The shaft 13 is driven from the shaft 11 by gears 20 and 21 and rotation may be transmitted from the shaft 13 to the shaft 14 at relatively fast or slow rates through the gears 22—23 and 24—25, respectively. The gears 23 and 25 are rotatably journaled on the shaft 14 and are adapted alternately to be connected to said shaft by a shiftable clutch member 26 splined to the shaft and adapted to engage clutch teeth 27 and 28 provided by the gears 23 and 25, respectively.

The feed-cams K for the tool-heads A, B and C are mounted upon horizontally disposed shafts 29, 30 and 31, respectively, journaled in the main frame. To these shafts are secured worm-wheels 32, 33 and 34, meshing with worms 35, 36 and 37, fixed to vertically disposed shafts 38, 39 and 40, respectively, journaled in the main frame of the machine. Bevel gears 41 and 42, fixed to the shaft 14, mesh with similar gears 43 and 44, respectively, on the shafts 38 and 40 and thereby transmit rotary motion to those shafts. The shaft 39 is driven indirectly from the shaft 14 through bevel gears 45, 46, shaft 15, and bevel gears 47 and 48.

The slow drive from the shaft 13 to the shaft 14 (through gears 24 and 25) is utilized to effect slow rotation of the cams K during the forward or working stroke of the tools. After the machining operations have been completed the clutch member 26 is shifted out of engagement with the clutch on the gear 25 and into engagement with the clutch on the gear 23, thereby effecting rapid rotation of the shaft 14, and cams K, and consequently a more rapid retraction of the tool-heads than could be effected by the cams under slow rotation. Any suitable means may be provided for manually or automatically shifting the clutch-member 26 at the proper time.

The shaft 13 is also utilized to actuate the indexing mechanism for the work-turret. To that end, a worm 49 is rotatably journaled on said shaft and is adapted selectively to be secured thereto through the action of a clutch member 50 splined to the shaft. This clutch member also serves at certain times to secure the gear 22 to the shaft 13. The worm 49 meshes with and drives a worm-wheel 51 fixed to a vertically disposed shaft 52 which carries at its upper end the Geneva index driver 6 hereinbefore fully described. Any suitable means may be provided for shifting the clutch member 50 into engagement with the clutch element 22ˣ on the gear 22 to affix that gear to the shaft 13, or to shift the clutch member into engagement with the clutch element 49ˣ on the worm 49, or to hold it in its neutral position as illustrated in Figure 4 during the slow forward feed of the tool heads.

Means is provided for definitely locating the work-turret angularly on the main frame after each indexing movement of the former and for maintaining it against any rotary movement during the machining operation. This means preferably comprises a bolt 53 slidingly mounted in a slideway 54 formed in the main frame, said bolt being provided with a tapered end adapted to enter suitably spaced apertures formed in the underside of the work-turret. This bolt may be shifted axially to cause it to engage and disengage said apertures in timed relation with the operation of the indexing mechanism by a cam 55 fixed to the index shaft 52. For convenience of manufacture a lever 56 may be utilized to transmit motion from the cam 55 to the bolt 53.

To preclude any vibration or movement of the turret on the main frame during the machining operation means is provided for securely clamping the turret to the main frame. This clamping means preferably comprise a split ring 57 (see Fig. 2) arranged in an annular groove 58 formed in the turret-supporting portion of the main frame. Intermediate the two ends of the split ring there is arranged a cam 59 secured upon a rock-shaft 60 journaled in the main frame. Oscillation of the shaft 60 causes the cam to act upon the ends of the split ring, thereby to expand said ring into binding contact with the inner annular wall 61 of the turret, and inasmuch as the ring is then held against movement relative to both the frame and the turret it serves to lock the two together. Any suitable means may be provided for rocking the shaft 60. For example, a cam 62 may be mounted on the index shaft 52 and this cam may actuate a lever 63 fulcrumed at 64 and connected by a link 65 with an arm 66 connected to the rock shaft 60.

To enable the operator to remove the finished work-piece from the work-holder when it reaches the unloading station means is provided for individually discontinuing the rotation of each work-holder after the last machining operation has been performed on the work-piece without discontinuing the rotation of its spindle driving gear 3. This has been attained by providing a suitable clutch V, preferably of the friction type, for securing each of said spindle driving gears to its individual spindle, and by providing automatically acting means for individually disconnecting the clutch of each spindle as the work-holder is moved from its last operative position. To effect this actuation of the clutches, each clutch has operatively connected to it one arm of a bell-crank lever 67 fulcrumed at 68 on the work-turret. The other arm is connected to a slide bar 69 carrying a stud or roller 70 adapted in the rotary movement of the turret, to engage a stationary cam 71 fixed to the machine frame. The action of the cam on the roller serves to pull downwardly on the bar 69, thereby rocking the lever 67 counter-clockwise, as viewed at the left of Fig. 2, and disconnecting the clutch. The chuck, therefore, comes to rest at the unloading station whereupon the operator removes the finished work-piece and replaces it with an unfinished piece. Upon the next indexing movement of the turret the stud 70 rides over a cam 72, also fixed to the machine frame. This pushes upwardly on the bar 69, thereby rocking the bell-crank lever to again connect the clutch V so that by the time the work-holder reaches a position adjacent the tool-head A it is being rotated at a speed suitable for a machining operation.

As heretofore stated, this invention contemplates so mounting one or more externally operating turning tools that the tool and its carrier may be moved out of the path of the work, as the turret in indexed, by a relatively small vertical movement. For this purpose the tool-head C is shown as providing a vertically arranged guideway 73 upon which is slidingly mounted a saddle 74 having a laterally offset tool-holder 75 supporting the turning tool t about the work piece W. Any suitable means may be provided for shifting the saddle 74 vertically on the ways 73. As shown in Fig. 1 this may be accomplished by means of a bell-crank lever 76 fulcrumed at 77 in the tool-head, one arm of the lever being connected with the saddle and the other arm carrying a roller 78 tracking a cam groove 79 formed in the cam cylinder K.

Fig. 6 shows a modified arrangement of the work-spindles, together with a modified drive therefor. In this construction the spindle drive-shaft 2 carries a worm 80 which meshes with and drives a worm-wheel 81 fixed to the inner end of each of the spindles S, which, in this arrangement are not truly radial but are off-set to one side of radial lines Z as shown. This modified construction is preferable under certain conditions as it provides a material speed reduction between the shaft 2 and the work spindles. It also provides a more powerful and better balanced drive than may be obtained by other means. Still another advantage gained by this modified construction is that the force of the tool on the work, represented by the arrows p, tends to turn the work-turret in the direction indicated by the arrow m thereby constantly urging the side-wall n of the turret-locking aperture into engagement with locking bolt 53. This takes up all back-lash or lost motion between the aperture and the bolt and between the bolt and its slideway, thereby maintaining the turret and the work-holders in a definite position during each machining operation even though the locking bolts, its slideways, or the locking aperture may become slightly worn.

For certain purposes it is desirable positively to rotate the work-spindles instead of rotating them impositively by means of friction clutches as hereinbefore described. Fig. 7 shows an improved drive for positively rotating the work-spindles and yet avoiding the shocks incidental to the engagement of tooth clutches. In this modified construction the driven gears 3 are secured upon jack shafts 85 journaled in the turret T. Upon each of the shafts 85 is fixed a gear 86 permanently in mesh with a gear 87 provided by a combined gear and clutch member 88 rotatably and translatably mounted on the spindle S which, in this instance, is journaled in bearings 89 provided by the work-turret. The member 88 is formed with a friction clutch element 90 and a toothed clutch element 91 adapted selectively to engage, respectively, with a friction clutch element 92 and a toothed clutch element 93, both fixed upon the spindle S. A hand actuated lever 94 fulcrumed at 95 upon a cover plate 96, carries, at one end, a stud 97 (shown in dotted lines only, in Fig. 7) which tracks an annular groove 98 in the member 88. This lever serves, when swung in the direction indicated by the arrow a from the neutral position shown in Fig. 7 to the position represented by the center line a' to shift the member 88 toward the work holder H, thereby to engage the friction clutch elements 90 and 92. When the lever is swung in the direction indicated by the arrow b to the position represented by the center line b' it shifts the member 88 in the opposite direction, thereby engaging the clutch elements 91 and 93, which serve positively to rotate the spindle during the machining operations.

In a machine equipped with this improved drive when the table is indexed to bring one of the work-holders to the unloading and loading station the operator takes hold of the lever 94 and swings it in the direction indicated by the arrow a from the position represented by the line b' to the neutral position shown in full lines in Fig. 7. This disengages the tooth clutch 91—93 and permits the spindle and work-holder to come to rest, thereby permitting the operator to remove the finished work-piece and replace it with a rough piece. When the new work-piece has been secured in the work-holder the operator grasps the hand grip on the lever 94 and pushes the lever from its neutral position to the position represented by the line a'. This movement of the lever shifts the continuously rotating clutch member 90 into engagement with the clutch member 92 and starts the spindle to rotate under friction drive. When the spindle has attained the speed of the gear 87 the operator pulls the lever to the position indicated by the line b', thereby disconnecting the friction clutch 90—92 and engaging the positive clutch 91—93. Inasmuch as the clutch elements 91 and 93 are at that time rotating at the same rate the teeth thereof readily may be engaged without clashing and without shock. The index mechanism then becomes effective and the work-turret is turned to present the new work-piece to the action of the first tool.

Fig. 8 shows a modification rendered available by the radial arrangement of the work spindles. As shown in this figure the turret T may be equipped with a plurality of sets of radially disposed work spindles arranged one above the other, thereby producing what may be termed "a double-deck machine." In a machine so equipped, one set of spindles may be used for one series of operations on a given work-piece and the other set for a second series of operations. Or both sets may be used to perform the same operation, thereby doubling the capacity of the machine. Fig. 8 illustrates two sets of work spindles, but it is to be understood that a greater number of sets may be provided if desired. Likewise Fig. 8 shows the two sets of spindles in vertical alignment but, in some instances, it may be desirable to have the two sets spaced apart angularly about the turret. For example, in a double-deck machine in which each series comprises four spindles, the spindles of the two series may be spaced apart 45 degrees.

In a chucking machine embodying two or more series of spindles each of the tools preferably, but not necessarily, will be carried in an individual tool head.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalency thereof, by Letters Patent of United States:—

1. A chucking machine of the work-rotating type combining a rotatable work-turret; a plurality of rotatable work-spindles supported on said turret with their axes substantially radial thereto; common means for rotating all of said spindles at a uniform rate; a work-holder secured to the outer end of each of said spindles; tools arranged about said work-turret and adapted successively to be brought into operative engagement with work-pieces carried by said work-holders, one of said tools being rotatable and means to rotate said one of said tools thereby to vary the rate of relative rotation between one of said work-spindles and said one of said tools.

2. A chucking machine of the work rotating type, combining a rotatable work-turret; a plurality of rotatable work-spindles journaled on said turret; a work-holder secured to the outer end of each of said spindles; common means for rotating all of said spindles at a uniform rate; a plurality of rotatable tools arranged about said work-turret, said tools being adapted successively to operate upon work-pieces carried by said work-holders; and individual means to rotate each of said tools at a predetermined rate to produce relative rotation at various rates between said work-pieces and said tools.

3. A chucking machine of the work-rotating type, combining a work-turret; means to index said turret; a plurality of rotatable work-spindles journaled on said turret with their axes substantially radial thereto; a work-holder secured to the outer end of each of said spindles; common means for rotating all of said spindles at a uniform rate; a plurality of tool-heads arranged about said work-turret; a rotatable tool carried by each of said tool-heads and adapted successively to be brought into operative engagement with work-pieces carried by said work-holders; and means carried by each of said tool-heads to rotate its tool in forward and reverse directions thereby to vary the rate of relative rotation between each tool and the rotating work-piece upon which said tool is operating.

4. A chucking machine of the work-rotating type combining a rotatable work-turret; a plurality of radially disposed rotatable work-spindles carried thereby; means to rotate said spindles; a work-holder secured to the outer end of each spindle; a plurality of tools rotatably and translatably mounted about said work-turret and adapted successively to operate on work-pieces carried by said work-holders, individual means each including its own prime mover for rotating each of said tools; and individual means for giving to each of said tools feed and retractive movements.

5. A chucking machine of the work-rotating type combining a rotatable work-turret; a plurality of radially disposed rotating spindles carried thereby; a work-holder carried by the outer end of each of said spindles; a plurality of translatable tool-heads arranged about said work-turret; individual means to translate said tool-heads toward and from said work-holders; a tool rotatably journaled in each of said tool-heads; an electric motor mounted upon each of said tool-heads and translatable therewith; and a driving connection between each of said motors and the tool carried by the tool-head upon which the motor is mounted to rotate said tool, the rate of relative rotation between the tool and the work-piece being the algebraic sum of the rotations of the two.

6. A chucking machine of the work-rotating type combining a frame; a rotatable work-turret supported by said frame; means to index said turret; a plurality of radially disposed rotatable work-spindles journaled in said turret; common means for rotating all of said spindles at a uniform rate; a work-holder carried by the outer end of each of said spindles; a plurality of tool-heads translatably mounted on said frame about said work-turret; a rotatable cam mounted in said frame adjacent each of said tool-heads; means to rotate said cams; an operative connection between each of said cams and one of said tool-heads to effect reciprocation of the latter by rotation of the former; and an electric motor carried by one of said tool-heads and operably connected with the tool to rotate it, thereby to produce relative rotation between said tool and the then adjacent work-piece at a rate other than the rate of rotation of said work-spindles.

7. A chucking machine of the work rotating type combining a rotatable work-turret; means to index said turret; a plurality of radial disposed rotating spindles journaled in said turret; a work-holder secured to the outer end of each of said spindles; a plurality of tools located about said work-turret and adapted successively to act upon work-pieces carried by said work-holders, one of said tools being a turning tool; means supporting said turning tool at one side of the said work-holders; and means to move said turning tool transversely to the axis of said work-holder to remove it from the work in said work-holder thereby to permit said work holder and the work therein to be indexed with said turret.

8. A chucking machine of the work-rotating type combining a frame; a horizontally disposed work-turret rotatably mounted on said frame; means to index said turret; a plurality of radially disposed rotating spindles journaled in said turret; a work-holder secured upon the outer end of each of said spindles; a plurality of tool-heads mounted on said frame about said turret; a vertically arranged slideway provided by one of said tool-heads; a saddle slidably mounted on said slideway; a turning tool carried by said slideway, said tool being arranged above the axis of an adjacent work-holder; and means to slide said saddle vertically to move its tool into and out of contact with a work-piece held in an adjacent work-holder.

9. A chucking machine of the work rotating type combining a frame; a horizontally disposed work-turret rotatably mounted on said frame; a plurality of radially disposed rotating spindles journaled in said turret; a work-holder secured to the outer end of each of said spindles; a plurality of tool-heads translatably mounted upon said frame about said turret; individual means to translate each of said tool-heads toward and from said turret; a vertically arranged slideway provided by one of said tool-heads; a saddle slidably mounted on said slideway; a turning tool carried by said saddle; and means to slide said saddle vertically to move its tool into and out of contact with a work-piece held in an adjacent work-holder.

10. A chucking machine of the work-rotating type combining a frame; a work-turret rotatably mounted on said frame; a plurality of radially disposed spindles journaled in said turret; a work-holder secured upon the outer end of each of said spindles; means to rotate said spindles; a plurality of tool-heads translatably mounted on said frame about said turret; individual rotary cams operatively connected with said tool-heads; means slowly to rotate said cams to effect forward feed of said heads; and means to accelerate the rotation of said cams rapidly to retract said tool-heads.

11. A chucking machine of the work-rotating type combining a frame; a work-turret rotatably mounted on said frame; a plurality of radially disposed rotatable work-spindles journaled on said turret; means to rotate said spindles; a work-holder secured upon the outer end of each of said spindles; a plurality of tool-heads supported by said frame about said work-turret, the number of said heads being one less than the number of said spindles, the idle position constituting a loading and unloading station; a tool carried by each of said tool-heads, said tools being adapted successively to operate on work-pieces carried by said work-holders; means to index said turret, successively to present the work-pieces to said tools; and automatic means to discontinue the rotation of each of said spindles as it is indexed from one of said tool-heads to the loading and unloading station.

12. A machine tool combining a rotatable element; members spaced equally about said element and cooperating therewith periodically to perform machining operations; Geneva index mechanism for giving to said element two-stage indexing movements, the combined amplitude of which is equal to the angular spacing of said members said two-stage movement being effected by two immediately successive actuations of said Geneva index mechanism; and means to arrest the rotation of said element after each two-stage movement to permit said members to perform their machining operations.

13. A machine tool combining a rotatable element; members spaced equally about said element and cooperating therewith periodically to perform machining operations; means for giving to said element two-stage indexing movements, the combined amplitude of which is equal to the angular spacing of said members, said indexing means comprising a disk operatively connected with said element and formed with a plurality of radial slots angularly spaced apart one-half the angular spacing of said members; a rotatable driving element; two studs located at diametrically opposite points on said driving element; means to give to said driving element an uninterrupted complete rotation to cause each of said studs to enter and emerge from one of said slots whereby said studs successively index said disk one-half the angular spacing of said member; and means to discontinue the rotation of said driving element after each two-stage movement of said disk.

14. A chucking machine combining a rotatable turret; means to index said turret; a locking bolt engaging an aperture in said turret to hold it against displacement between indexing movements; a plurality of rotatable spindles journaled on said turret with their axes off-set to one side of and transverse to the axis of said turret; a work-holder secured upon one end of each of said spindles; a plurality of tools arranged about said turret and adapted successively to operate upon work-pieces carried by said work-holders; a rotating spindle drive-shaft arranged coaxial with said turret; a single worm on said drive shaft meshing with all of said worm-wheels to transmit rotary motion to all of said spindles, the off-set arrangement of said spindles tending to convert the pressure of the tools on the work into rotary movement of the turret, thereby forcing one wall of said aperture into engagement with said locking bolt.

15. A chucking machine of the work-rotating type combining a rotatable work-turret; a plurality of sets of rotating work-spindles supported on said turret with their axes substantially radial thereto, said sets of spindles being spaced apart in the direction of the axis of said work-turret; a work-holder secured to the outer end of each of said spindles; and tools arranged about the periphery of said turret and adapted successively to operate on work-pieces carried by said work-holders.

16. A chucking machine of the work-rotating type combining a work-turret rotatable on a vertical axis; a plurality of sets of rotating work-spindles supported on said work-turret with their axes substantially radial, said sets of spindles being spaced apart vertically; a work-holder secured to the outer end of each of said spindles; a spindle rotating drive shaft coaxial with said turret; an operative connection between said drive and each of said spindles; and a plurality of sets of tools arranged about said work-turret, the tools of each set being adapted successively to operate on work pieces carried by one of said sets of spindles.

17. A chucking machine combining a work-turret; a plurality of rotatable work-spindles carried by said work-turret; a work-holder secured to each of said spindles; a drive-shaft common to all of said spindles; a continuously rotating driving train carried by said turret and connecting said drive-shaft and each of said spindles, said drives each comprising a friction clutch and a positive clutch; and means carried by said work-turret successively to actuate said clutches.

18. A chucking machine combining a work-turret; a plurality of rotatable work-spindles rotatably carried by said work-turret; a work-holder secured upon one end of each of said spindles; individual driving trains for each of said spindles, said driving trains including an impositive clutch and a positive clutch carried by and rotatable with said work-turret; and manually actuated means carried by said turret for first actuating said impositive clutch to initiate rotation of the spindle and then to actuate said positive clutch to effect a positive drive of said spindle.

19. A chucking machine combining a work-turret; a plurality of rotatable work-spindles journaled in said work-turret; a work-holder secured to each of said spindles; a friction clutch element and a toothed clutch element fixed upon each of said spindles; a member rotatably and translatably mounted on each of said spindles, intermediate said friction clutch and toothed clutch elements, and provided with friction and toothed portions adapted selectively to be engaged with said friction clutch and tooth clutch elements, respectively; means continuously to rotate said member; and a hand lever carried by said work-turret and having a constant relation with said member to shift said member axially to engage said friction and toothed clutches.

20. A chucking machine combining a work-turret; a plurality of rotatable spindles journaled in said work-turret; a work-holder carried by each of said spindles; a friction clutch element and a toothed clutch element fixed upon each of said spindles; a combined gear and clutch unit rotatably and translatably journaled on each of said spindles intermediate said friction and toothed clutch elements, said unit being provided with a gear, a friction surface and a toothed surface, said surfaces being adapted to engage said friction and toothed elements respectively; a drive shaft common to all of said spindles; a jack shaft journaled in said work turret adjacent each of said spindles; a driving connection between said drive shaft and each of said jack shafts; a gear fixed to each of said jack shafts and meshing with the gear on one of said spindles; and individual hand levers carried by said work-turret to shift each of said combined gear and clutch units axially selectively to engage said friction and toothed clutches.

In witness whereof, I hereunto subscribe my name.

JOSEPH JOHN SPRING.